(12) United States Patent
Miyazaki

(10) Patent No.: US 6,574,379 B2
(45) Date of Patent: Jun. 3, 2003

(54) OPTICAL DEVICE AND ITS MANUFACTURING METHOD

(75) Inventor: Yasunori Miyazaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 85 days.

(21) Appl. No.: 09/779,840

(22) Filed: Feb. 9, 2001

(65) Prior Publication Data

US 2002/0048421 A1 Apr. 25, 2002

(30) Foreign Application Priority Data

Oct. 19, 2000 (JP) .................................. 2000-319707

(51) Int. Cl.$^7$ ................................................ G02F 1/01
(52) U.S. Cl. ................................................ 385/1; 385/88
(58) Field of Search .................................. 385/1, 88–94, 385/14, 50, 18, 24, 15, 39, 49, 45, 47, 130; 372/50, 46, 43; 257/81, 98, 99, 434, 433

(56) References Cited

U.S. PATENT DOCUMENTS

| 5,228,101 A | * | 7/1993 | Lebby et al. ................. 385/91 |
| 5,353,364 A | * | 10/1994 | Kurashima ................... 385/88 |
| 5,412,748 A | * | 5/1995 | Furuyama et al. ............ 385/92 |
| 5,621,837 A | | 4/1997 | Yamada et al. ............... 385/88 |
| 6,021,149 A | | 2/2000 | Miyazaki et al. ............. 372/50 |
| 6,058,234 A | * | 5/2000 | Tachigori .................... 385/49 |
| 6,108,477 A | * | 8/2000 | Schneider et al. .......... 385/129 |
| 6,343,171 B1 | * | 1/2002 | Yoshimura et al. ........... 385/50 |

FOREIGN PATENT DOCUMENTS

JP          10-56163         2/1998

* cited by examiner

*Primary Examiner*—J. F. Duverne
(74) *Attorney, Agent, or Firm*—Leydig, Voit & Mayer, Ltd.

(57) ABSTRACT

An optical device having superior frequency characteristics and high optical axis stability. The back surfaces of an optical modulator and a pair of transmission lines are bonded to a pedestal with the transmission lines located on opposite sides of the optical modulator. Conductive bumps are located on the transmission lines and electrode pads on the front surface of the optical modulator. A connection transmission line is bonded to the bumps, so the electrode pads of the optical modulator are connected to the transmission lines via the connection transmission line.

13 Claims, 13 Drawing Sheets

20

70

OPTICAL DEVICE AND ITS MANUFACTURING METHOD

BACKGROUND OF THE INVENTION

1. Field of the Invention

The present invention relates to an optical device and its manufacturing method. In particular, the invention relates to an optical modulation device used for optical communication and its manufacturing method.

2. Description of the Related Art

To spread public communication networks using optical fibers, it is important to improve the performance of semiconductor lasers and to increase the yields of semiconductor lasers to manufacture them at low costs.

In particular, to improve the performance of semiconductor lasers, it is indispensable to enable high-speed modulation of laser light to cope with an increase in information quantity. For the purpose of high-speed modulation of laser light, an external modulation scheme is employed to reduce wavelength variation in modulation and thereby enable long-range transmission. In the external modulation scheme, usually, laser light is emitted from a semiconductor laser at constant intensity and then modulated by inputting it to an optical modulator passing or interrupting light (on/off control).

The electro-absorption modulator (hereinafter abbreviated as EAM) is used as an optical modulator in the external modulation scheme. Extinction is attained by using a variation in absorption spectrum due to the Franz-Keldysh effect (in an EAM using a single-layer, thick light absorption layer) or the Stark shift effect (in an EAM using a multiple quantum well structure).

In optical modulators, the degree of absorption of laser light varies depending on the voltage applied. Therefore, if a modulation signal voltage is applied to a high-frequency electric circuit that is connected to an optical modulator, laser light that is emitted from the exit end face of the optical modulator is given intensity modulation corresponding to the signal voltage.

FIG. 11 is a perspective view of a conventional optical device.

In FIG. 11, reference numeral 200 denotes an optical device; 202, an optical modulator; 204, a coplanar line as a transmission line; 224, a termination resistor; 228, bumps; 210, an optical waveguide layer; and 212, laser light (indicated by an arrow) that is input to the optical waveguide layer 210.

FIG. 12 is a perspective view of the conventional optical modulator 202.

In FIG. 12, reference numeral 214 denotes p-side electrode pads; 216, n-side electrode pads.

FIG. 13 is a perspective view of the conventional transmission line 204.

In FIG. 13, reference symbol 204a denotes a signal line of the coplanar line 204; 204b, ground lines of the coplanar line 204; 224, a termination resistor; and 226, a substrate member of the transmission line 204.

Reference numeral 228 denotes conductive bumps that are placed on the signal line 204a and the ground lines 204b.

Next, an assembling procedure of the conventional optical device 200 will be described.

With the line surface of a coplanar line 204 located above, two bumps 228 are formed on each of the signal line 204a and the ground lines 204b. The bumps 228 are formed at positions corresponding to the p-side electrode pads 214 and the n-side electrode pads 216 of the optical modulator 202.

Thereafter, the front surface of the optical modulator 202 is opposed to the coplanar line 204 and then put on the coplanar line 204 in such a manner that the p-side electrode pads 214 and the n-side electrode pads 216 are placed on the respective bumps 228. The optical modulator 202 and the coplanar line 204 are bonded to each other via the bumps 228 by applying pressure at an increased temperature.

In the conventional optical device 200 that is assembled in the above manner, the bumps 228 have both a role as conductors for electrically connecting the coplanar line 204 and the optical modulator 202 and a role as fixing the optical modulator 202 on the coplanar line 204 and supporting the optical modulator 202.

Having smaller electrical resistance and inductance than conventional bonding wires, the bumps 228 provide an advantage that the optical device 200 is given superior frequency characteristics.

However, because of a variation in ambient temperature that occurs due to heating of peripheral devices of the optical device 200 or depending on the temperature condition of a use environment, the bumps 228 may be thermally deformed (expansion or contraction) during use of the optical modulator 202.

In the conventional optical device 200, since only the bumps 228 have the role of fixing and supporting the optical modulator 202, thermal deformation of the bumps 228 results in a positional variation of the optical modulator 202 that is supported by the bumps 228. As a result, the optical modulator 202 deviates from an optical system that is fixed independently of the optical modulator 202 and deterioration occurs in characteristics due to an optical axis deviation or the like.

As described above, in general, bumps, which have smaller electrical resistance and inductance than bonding wires, can provide an optical device having better high-frequency characteristics than an optical device using bonding wires. In particular, bumps enable formation of an optical device having superior frequency characteristics even in a case where a high-frequency modulation signal is handled as in the case of an optical modulator. However, the conventional optical device 200 has a problem that it cannot satisfy both of superior frequency characteristics and high optical axis stability for preventing deteriorations in characteristics due to an optical axis deviation or the like.

One prior art reference is Japanese Unexamined Patent Publication No. Hei. 10-56163. This publication discloses a photodetector that is mounted on a bare-chip IC via bumps and a bare-chip IC that incorporates a photodetector in a monolithic manner in view of the fact that wire bonding cannot provide stable ultrahigh-speed operation. However, in the former case, the photodetector is connected to the bare-chip IC via the bumps and the bare-chip IC is connected to a fixed side via bumps. Similarly, in the latter case, the bare-chip IC is connected to a fixed side via bumps. In either case, the photodetector side is connected, via the bumps, to a system in which an optical system is fixed and hence the above-described problem cannot be solved.

SUMMARY OF THE INVENTION

The present invention has been made to solve the above problem in the art, and an object of the invention is to provide an optical device having superior frequency characteristics and high optical axis stability.

An optical device according to the present invention comprises: an optical device pedestal; an optical modulator having a back surface that is joined to the pedestal and a front surface where a signal electrode pad and a ground electrode pad are arranged; a pair of transmission lines that are provided on the pedestal on both sides of the optical modulator and each of which has a signal line and a ground line on a front surface of a first dielectric substrate; conductive bumps provided on surfaces of the signal line and the ground line of each of the transmission lines and surfaces of the signal electrode pad and the ground electrode pad of the optical modulator, respectively; and a connection transmission line that has a signal connection line and a ground connection line provided on a front surface of a second dielectric substrate, that is oriented in such a manner that the signal connection line and the ground connection line are opposed to the bumps, and that connects, by means of the signal connection line and the ground connection line, the bumps on the electrode pads of the optical modulator with the bumps on the transmission lines.

Accordingly, an optical device according to the present invention is advantageous in that the optical modulator can directly be fixed to the pedestal, a positional deviation from an external optical system can be prevented that would otherwise be caused by a positional variation of the optical modulator due to thermal deformation of the bumps. The use of the bumps makes it possible to prevent deteriorations in optical characteristics due to an optical axis deviation or the like while maintaining superior frequency characteristics. Therefore, an optical device having high optical axis stability can be formed while superior frequency characteristics are maintained.

Another object of the invention is to provide a manufacturing method capable of manufacturing, by a simple process, an optical device having superior frequency characteristics and high optical axis stability.

A manufacturing method of an optical device according to the present invention contains the steps of: preparing an optical device pedestal having a joining portion; joining, to the joining portion of the pedestal, a back surface of an optical modulator having a signal electrode pad and a ground electrode pad on a front surface; providing, on both sides of the joining portion of the pedestal, a pair of transmission lines each having a signal line and a ground line on a front surface of a first dielectric substrate; forming conductive bumps on surfaces of the signal electrode pad and the ground electrode pad of the optical modulator and surfaces of the signal line and the ground line of each of the transmission lines; and orienting a connection transmission line having a signal connection line and a ground connection line on a front surface of a second dielectric substrate in such a manner that the signal connection line and the ground connection line are opposed to the bumps, and connecting the bumps on the electrode pads of the optical modulator with the bumps on the transmission lines by means of the signal connection line and the ground connection line.

Accordingly, a manufacturing method of an optical device according to the present invention is advantageous in that the manufacturing method makes it possible to manufacture an optical device having high optical axis stability by a simple process while maintaining superior frequency characteristics, and that an optical device having high optical axis stability and superior frequency characteristics can be provided at a low cost.

Other objects and advantages of the invention will become apparent from the detailed description given hereinafter. It should be understood, however, that the detailed description and specific embodiments are given by way of illustration only since various changes and modifications within the scope of the invention will become apparent to those skilled in the art from this detailed description.

BRIEF DESCRIPTION OF THE DRAWINGS

In all figures. substantially the same elements are given the same reference number.

DESCRIPTION OF THE PREFERRED EMBODIMENT

First Embodiment

An optical device according to this embodiment is as follows. The back surface of an optical modulator is bonded to an optical device pedestal. A pair of transmission lines is provided on both sides of the optical modulator with their front surfaces located above like those of the optical modulator. Conductive bumps are formed on p-side and n-side electrode pads that are formed on the front surface of the optical modulator and signal lines and ground lines that are formed on the front surfaces of the transmission lines. A connection transmission line is oriented face down, and a signal connection line and ground connection lines that are formed on the front surface of the connection transmission line are bonded to the bumps. In this manner, the p-side and n-side electrode pads of the optical modulator are connected to the signal lines and the ground lines of the transmission lines via the signal connection line and the ground connection lines of the connection transmission line.

Figure 1:
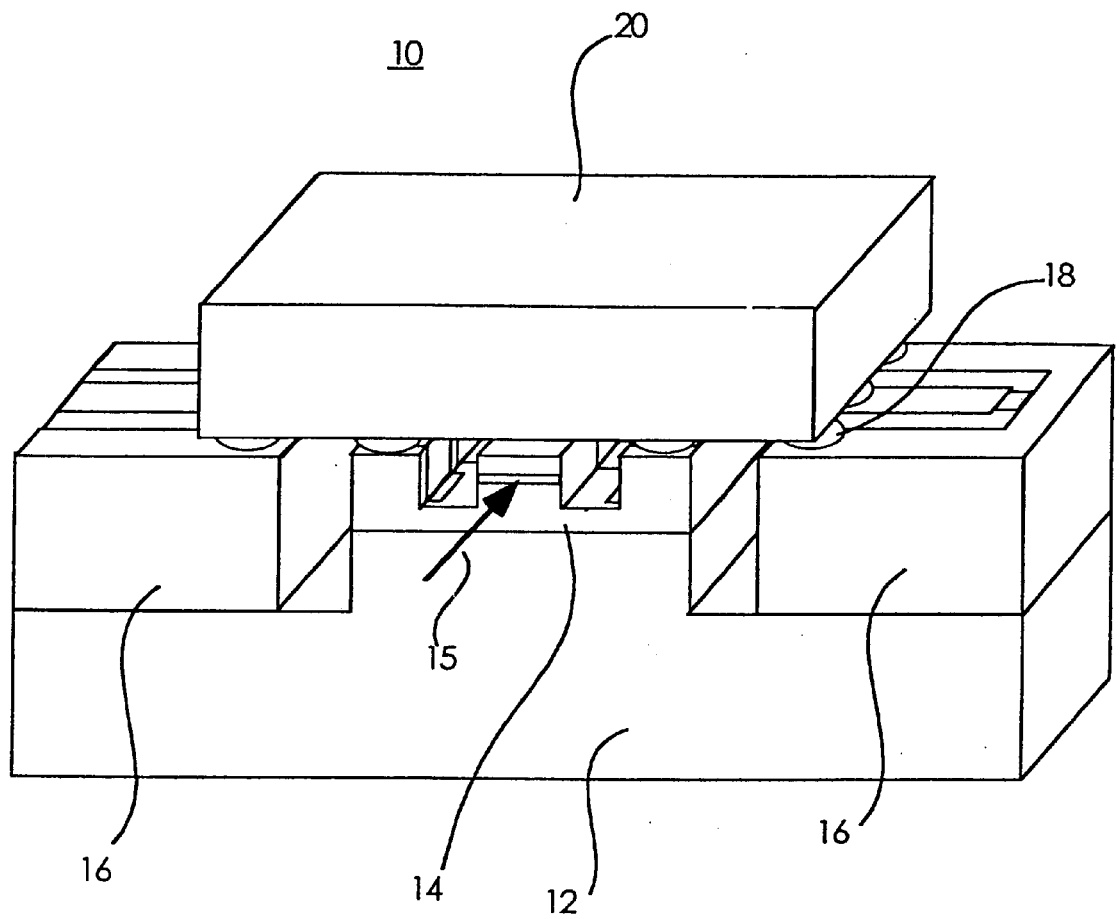
FIG. 1 is a perspective view of the optical device according to the invention.

FIG. 1 is a perspective view of the optical device according to the first embodiment of the invention.

In FIG. 1, reference numeral 10 denotes an optical device; 12, a chip carrier as an optical device pedestal; and 14, an optical modulator that is an electro-absorption modulator (EAM). Further, reference numeral 16 denotes transmission lines that are coplanar lines in this embodiment; 18, conductive bumps; and 20, a connection transmission line.

The optical modulator 14 measures about 300 μm in length and width and about 100 μm in thickness. Each transmission line 16 measures about 300 μm in width and about 200 μm in thickness. The bumps 18 measure about 30–50 μm in diameter. The width and the thickness of the connection transmission lien 20 are approximately equal to those of each transmission line 16.

Reference numeral 15 denotes laser light (indicated by an arrow) that is input to the optical modulator 14.

Figure 2:
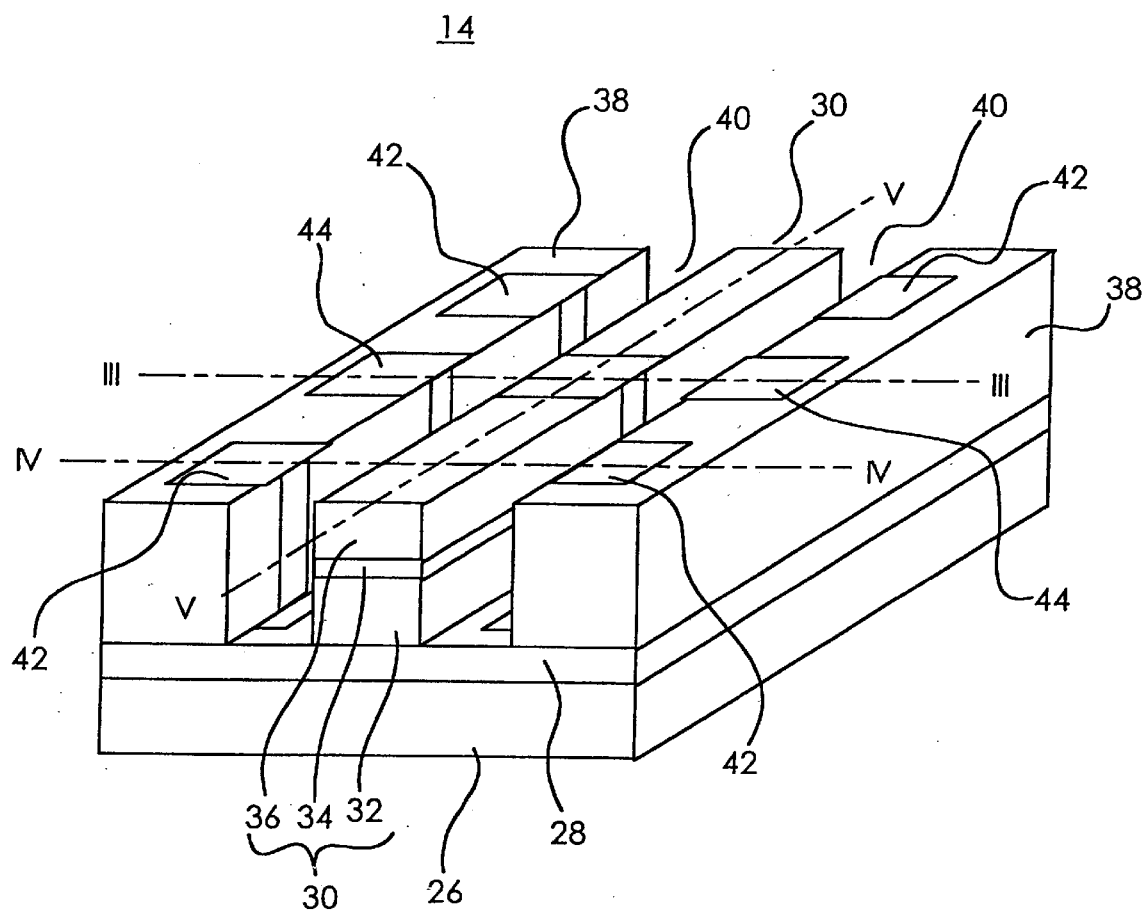
FIG. 2 is a perspective view of the optical modulator according to the first embodiment.

FIG. 2 is a perspective view of the optical modulator 14 according to the first embodiment. In FIG. 2, reference numeral 26 denotes an semi-insulating InP substrate; 28, an n-type conductivity InP layer that is laid on the InP substrate 26 (n-type conductivity and p-type conductivity will be hereinafter expressed as "n-" and "p-," respectively); and 30, an optical waveguide ridge 30 for guiding laser light that is formed on the n-InP layer 28 at the center. The optical waveguide ridge 30 is composed of an n-type cladding layer 32 of n-InP formed on the n-InP layer 28, an optical waveguide layer 34 of InP formed on the n-type cladding layer 32, and a p-type cladding layer 36 of p-InP formed on the optical waveguide layer 34. Reference numeral 38 denotes electrode pad bases of InP that are formed on the n-InP layer 28 and extend parallel with the optical waveguide ridge 30 with separation grooves 40 interposed in between. The surfaces of the optical waveguide ridge 30, the separation grooves 40, and the electrode pad bases 38 are generally covered with an insulating film (not shown in FIG. 2) except that openings are formed at electrode connection points.

Reference numeral 42 denotes n-side electrode pads as ground electrode pads that are connected to the n-type cladding layer 32 of the optical waveguide ridge 30 via the n-InP layer 28. The n-side electrode pads 42 are metal films formed on the surfaces of the electrode pad bases 38 and are connecting the surfaces of the n-InP layer 28. Reference numeral 44 denotes p-side electrode pads as signal electrode pads that are a metal film formed on the top surfaces of the electrode pad bases 38, the separation grooves 40, and the optical waveguide ridge 30. The p-side electrode pads 44 are connected to the p-type cladding layer 36 through an opening (not shown in FIG. 2) that is formed in the insulating film (not shown in FIG. 2) on the top surface of the optical waveguide ridge 30.

Figure 3:
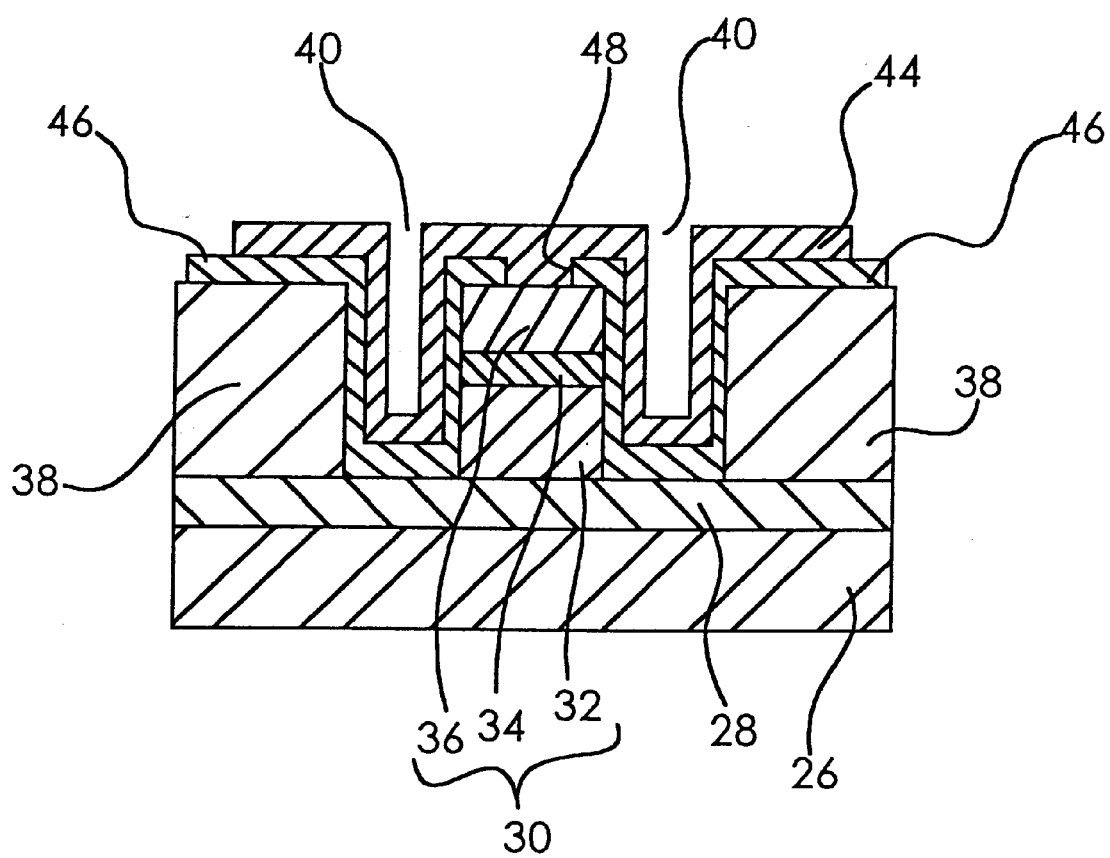
FIG. 3 is a sectional view taken along line III—III in FIG. 2.

FIG. 3 is a sectional view taken along line III—III in FIG. 2.

In FIG. 3, reference numeral 46 denotes an insulating film and 48 denotes an opening of the insulating film 46 that is formed above the surface of the p-type cladding layer 36. The p-side electrode pads 44 are connected to the p-type cladding layer 36 through the opening 48.

Figure 4:
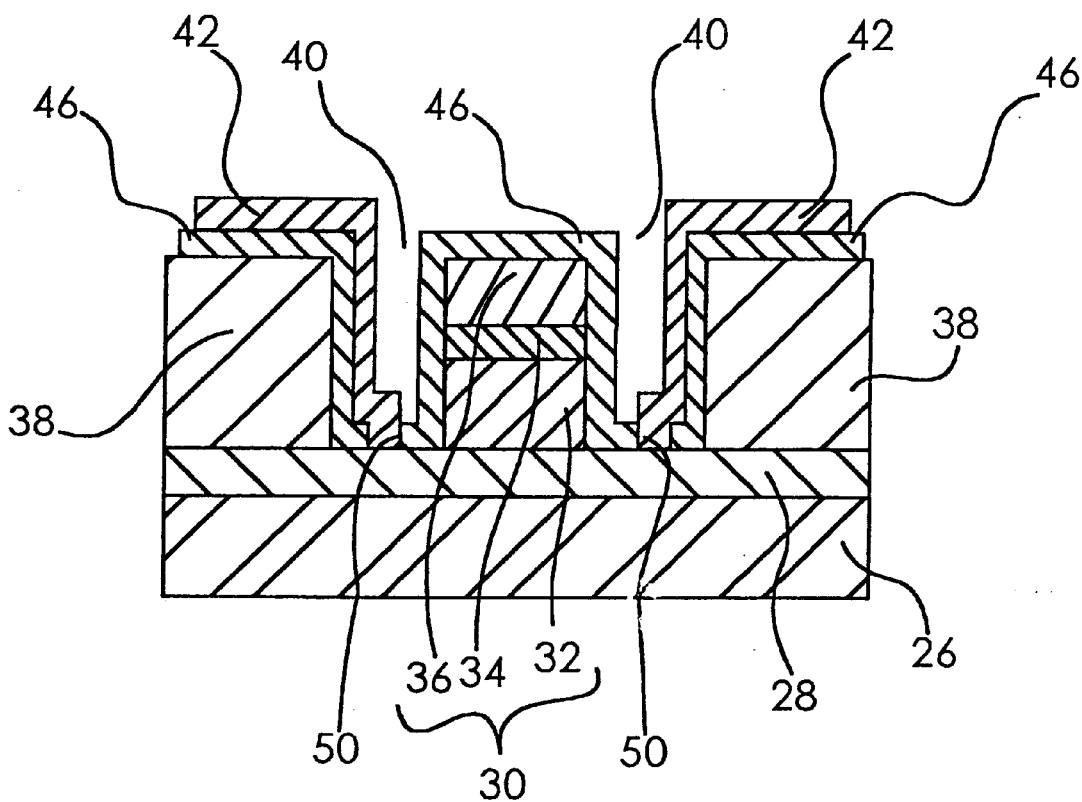
FIG. 4 is a sectional view taken along line IV—IV in FIG. 2.

FIG. 4 is a sectional view taken along line IV—IV in FIG. 2.

In FIG. 4, reference numeral 50 denotes openings formed in the insulating film 46 at the bottoms of the separation grooves 40. The n-side electrode pads 42 are connected to the n-InP layer 28 through the openings 50 and further to the n-type cladding layer 32 via the n-InP layer 28.

Figure 5:
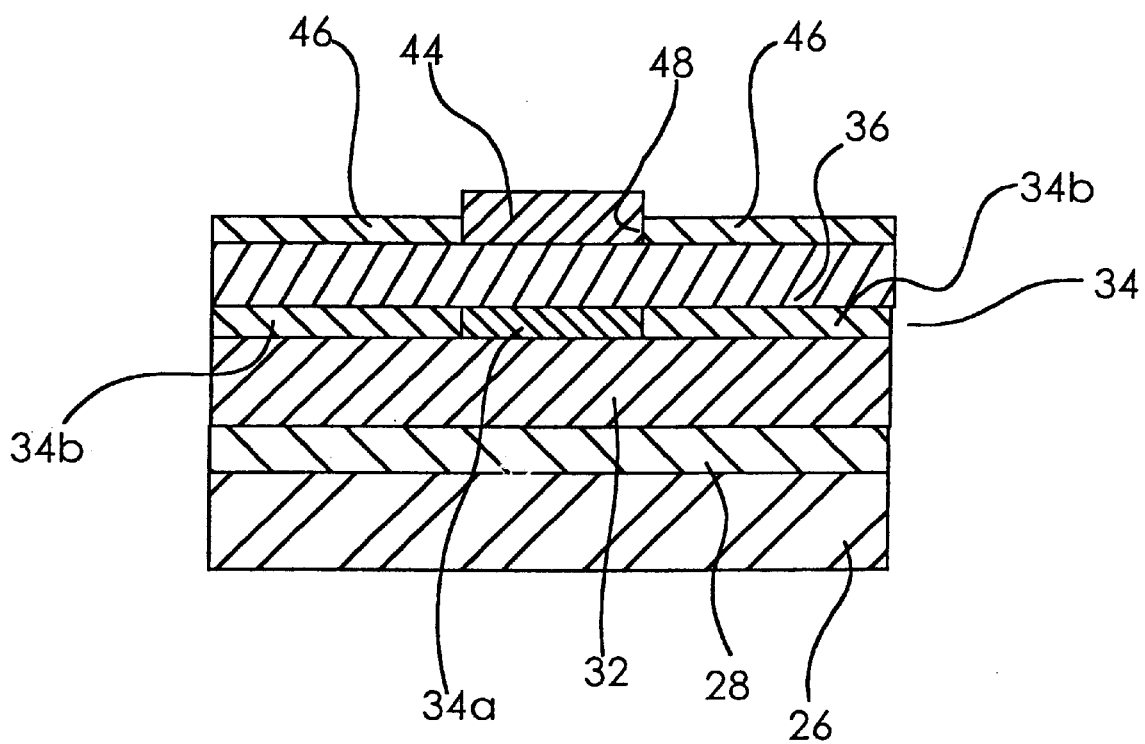
FIG. 5 is a sectional view taken along line V—V in FIG. 2.

FIG. 5 is a sectional view taken along line V—V in FIG. 2.

As shown in FIG. 5, the optical waveguide layer 34 is composed of a light absorption layer 34a that performs optical modulation and light transmission layers 34b that are provided on both sides of the light absorption layer 34a and transmit light with low loss. The p-side electrode pads (indicated by reference numeral 44) is formed right above the light absorption layer 34a with the opening 48 of the insulating film 46 and the p-type cladding layer 36 interposed in between.

Figure 6:
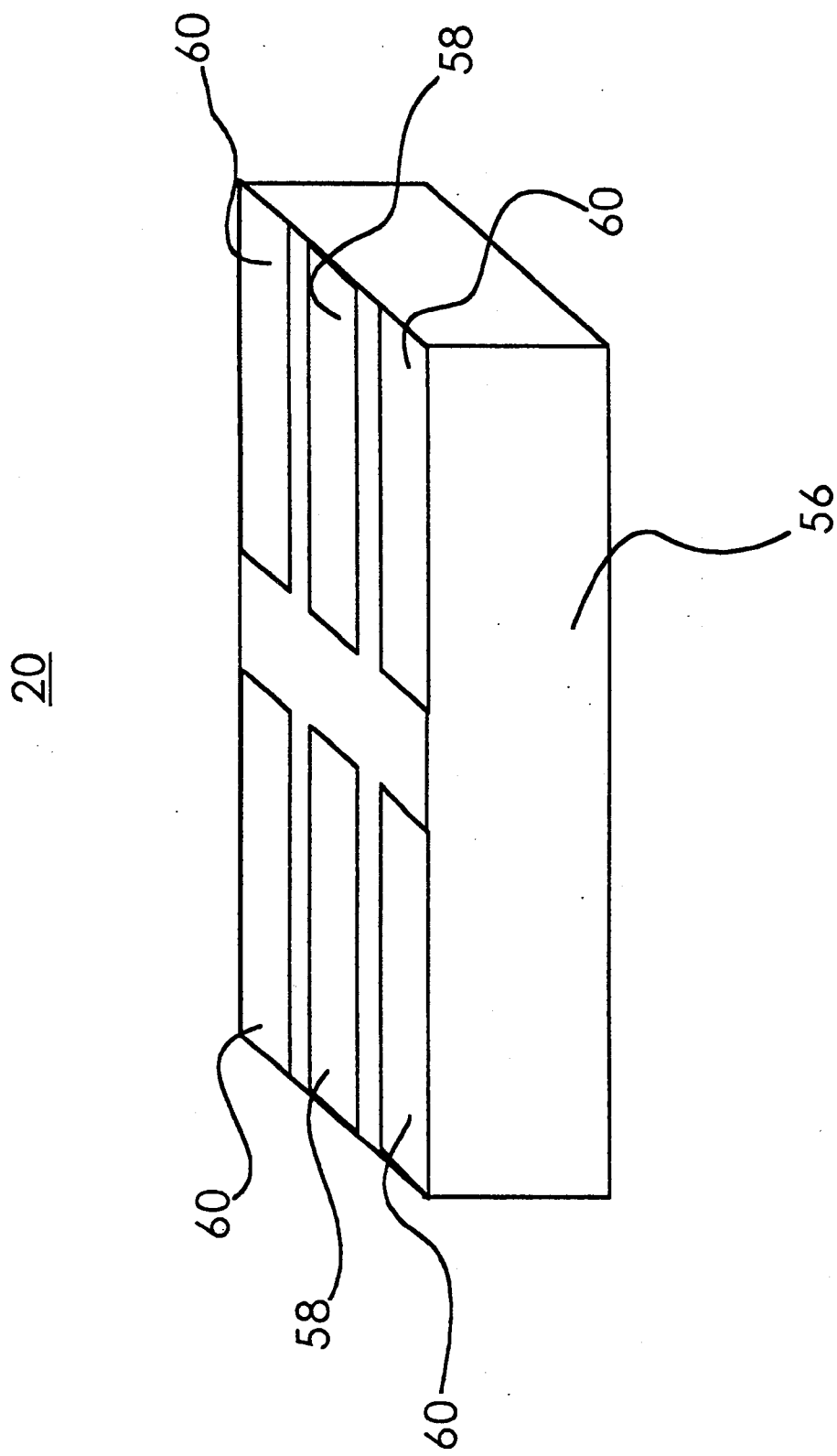
FIG. 6 is a perspective view of the connection transmission line according to the invention.

FIG. 6 is a perspective view of the connection transmission line according to the first embodiment.

In FIG. 6, reference numeral 56 denotes a connection line substrate as a second dielectric substrate that is made of ceramics such as alumina. Reference numeral 58 denotes a signal connection line and 60 denotes two ground connection lines. The signal connection line 58 and the ground connection lines 60 are formed by gold plating on the front surface of the connection line substrate 56 and together form a coplanar line. The width of each of the signal connection line 58 and the ground connection lines 60 is a little less than 100 μm.

In the connection transmission line 20, each of the signal connection line 58 and the ground connection lines 60 is divided into two parts at the center.

Figure 7:
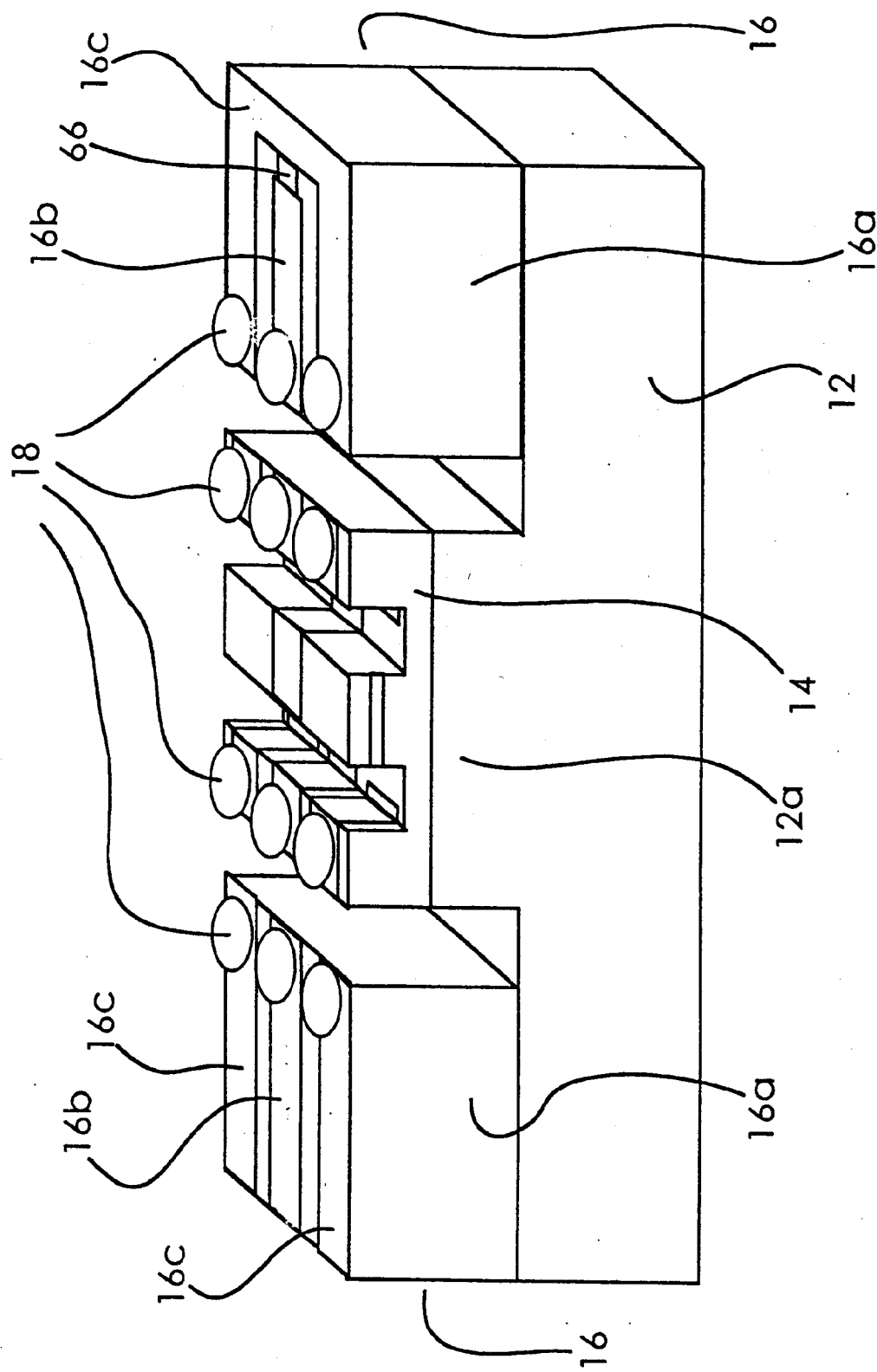
FIG. 7 is a perspective view of an optical device main body according to the invention.

FIG. 7 is a perspective view of an optical device main body according to the first embodiment.

As shown in FIG. 7, a chip carrier 12, which is made of metal or ceramics, has a projection 12a at the center. The back surface of the optical modulator 14 is bonded to the projection 12a. A pair of transmission lines 16 is bonded to the portions of the chip carrier 12 that are located on both sides of the projection 12a. The term "a pair of" means that the transmission line 16 on such a side as to be connected to external wiring (described later) and the transmission line 16 on the termination side.

The height of the projection 12a is so adjusted that the surfaces of the transmission lines 16 are flush with the surface of the optical modulator 14 that is bonded to the projection 12a.

The transmission lines 16 are formed as coplanar lines. Reference symbol 16a denotes transmission line substrates as first dielectric substrates that are made of ceramics such as alumina. Reference symbol 16b denotes signal lines and 16c denotes two sets of ground lines. One transmission line 16 is connected to external wiring (now shown) having an external signal line and a ground line. A modulation signal is input from the external wiring. In the other transmission line 16, which is on the termination side, the signal line 16b is connected to the ground lines 16c via a termination resistor 66. Usually, the termination resistor 66 is 50Ω. The signal line 16b and the ground lines 16c measure a little less than 100 μm in width and are formed by gold plating.

The optical device main body is composed of the chip carrier 12, the optical modulator 14, and the transmission lines 16.

Reference numeral 18 denotes conductive bumps made of gold, for example. The bumps 18 are formed on the p-side electrode pad 44 and the pair of n-side electrode pads 42 formed on each of the two electrode pad bases 38 located at both ends of the optical modulator 14 and on the signal line 16b and the ground lines 16c formed on the front surface of each of the two transmission lines 16.

Next, an assembling method of the optical device 10 according to the first embodiment will be described.

Referring to FIG. 7, the optical modulator 14 is oriented in such a manner that its front surface where the n-side electrode pads 42 and the p-side electrode pads 44 are formed is located above and then the back surface of the optical modulator 14 is bonded to the projection 12a of the chip carrier 12 with AuSn solder or the like.

Then, the pair of transmission lines 16 are bonded to the portions of the chip carrier 12 that are located on both sides of the projection 12a with AuSn solder or the like so as to be located adjacent to the optical modulator 14. Like the optical modulator 14, the transmission lines 16 are bonded to the chip carrier 12 in such a manner that their front surfaces where the signal line 16b and the two ground lines 16c are formed are located above. The projection 12a of the chip carrier 12 is formed in advance so as to have such a prescribed height that the surface of the optical modulator 14 will be flush with the surfaces of the pair of transmission lines 16.

Then, bumps 18 are formed on the p-side electrode pad 44 and the n-side electrode pads 42 formed on each of the electrode pad bases 38 of the optical modulator 14 that are located on both sides of the optical waveguide ridge 30 and the signal line 16b and the two ground lines 16c formed on the front surface of each of the two transmission lines 16.

Thereafter, the connection transmission line 20 shown in FIG. 6 is oriented in such a manner that its front surface where the signal connection line 58 and the ground connection lines 60 are formed is located below, and then put on the bumps 18 so that the signal connection line 58 is placed on the bumps 18 that are formed on the surfaces of the p-side electrode pads 44 and the signal lines 16b, and so that the ground connection lines 60 are placed on the bumps 18 that are formed on the surfaces of the n-side electrode pads 42 and the ground lines 16c.

Then, the bumps 18 are bonded to the signal connection line 58 and the ground connection lines 60 of the connection transmission line 20 by applying pressure to the connection transmission line 20 at an increased temperature.

As a result, the p-side electrode pads 44 of the optical modulator 14 are connected to the signal lines 16b of the transmission lines 16 via the signal connection line 58 of the connection transmission line 20 that is located above the bumps 18, and the n-side electrode pads 42 of the optical modulator 14 are connected to the ground lines 16c of the transmission lines 16 via the ground connection lines 60 of the connection transmission line 20 that are located above the bumps 18.

The optical device 10 shown in FIG. 1 is assembled in the above manner.

Figure 8:
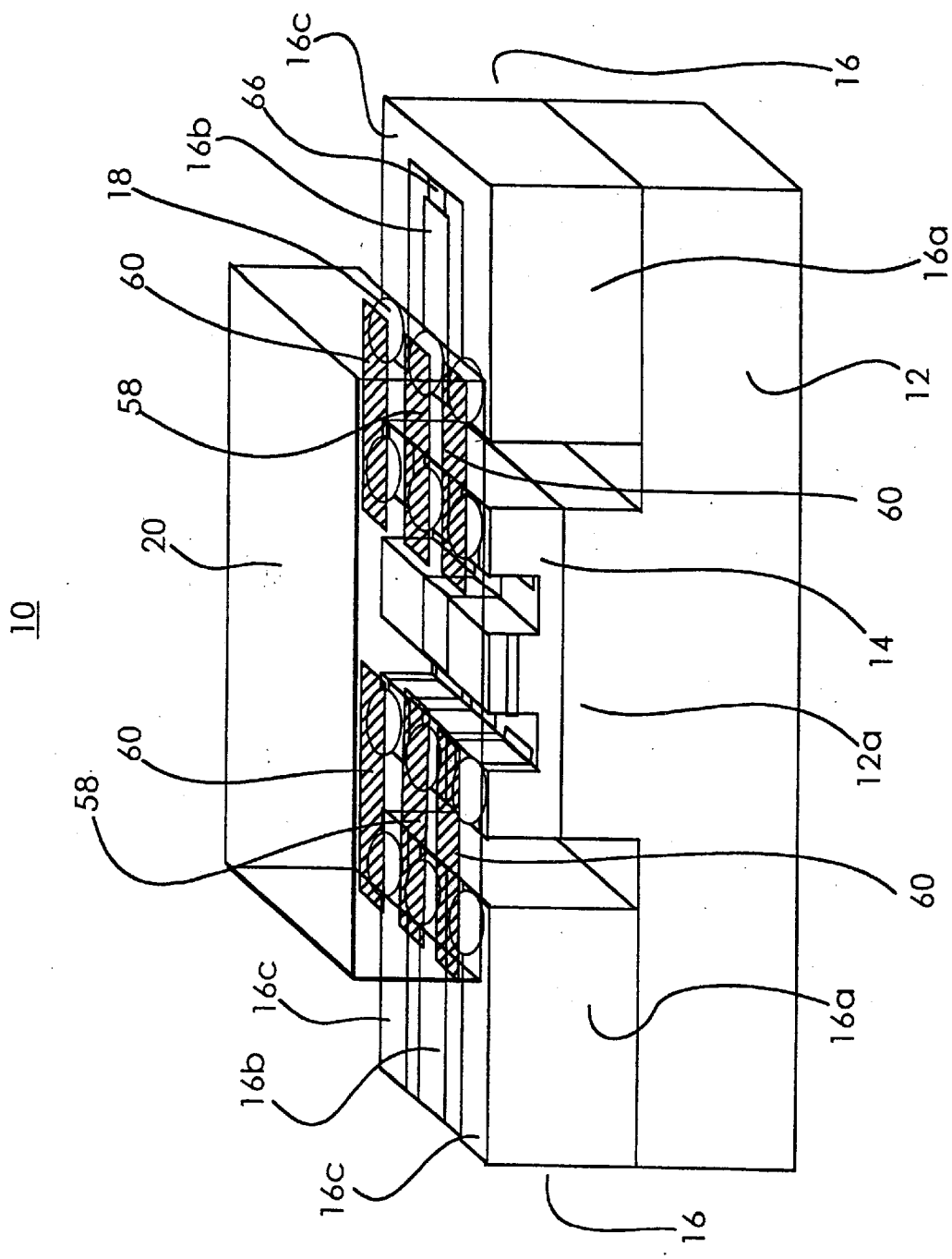
FIG. 8 is a partially see-through perspective view of the optical device according to the invention.

FIG. 8 is a partially see-through perspective view of the optical device 10 according to the first embodiment.

FIG. 8 is the same as FIG. 1 except that the connection line substrate 56 is drawn in see-through form to make the connection states of the connection transmission line 20 easily recognizable. The signal connection line 58 and the ground connection lines 60 of the connection transmission line 20 are hatched to improve the legibility of the connections of the signal connection line 58 and the ground connection lines 60 rather than to show cross-sections.

That is, the signal connection line 58 and the ground connection lines 60 of the connection transmission line 20 connect, via the bumps 18, the signal lines 16 band the ground lines 16c of the pair of transmission lines 16 to the p-side electrode pads 44 and the n-side electrode pads 42 on the electrode pad bases 38 that are located at both ends of the optical modulator 14.

Next, the operation will be described.

Laser light is input from an external optical system (not shown) to the optical device 10 via an optical fiber and a lens system. The laser light is incident on one face of the optical waveguide layer 34 of the optical modulator 14.

On the other hand, external wiring (not shown) having a signal line and a ground line is connected to the non-termination-side transmission line 16 of the optical device 10. A modulation signal is input from the external wiring to the signal line 16b of the transmission line 16. The modulation signal is transmitted to the signal connection line 58 of the connection transmission line 20 via the bump 18 and further to the p-side electrode pads 44 of the optical modulator 14 via the bump 18.

The electrical signal that is transmitted to the p-side electrode pads 44 is applied between the p-type cladding layer 36 and the ground-side n-type cladding layer 32 of the optical modulator 14 as a modulation signal voltage. The modulation signal voltage acts on the light absorption layer 34a right under the p-side electrode pads 44.

In the light absorption layer 34a, the laser light that is input to the optical waveguide layer 34 is passed/interrupted (on/off control) in accordance with the modulation signal voltage.

Modulated laser light is output from the other end face of the optical waveguide layer 34, guided to an optical fiber via a lens system, and transmitted to the external optical system.

Since the electrical signal is transmitted via the bumps 18 rather than bonding wires, reduced electrical resistance and inductance allow signal transmission that is superior in frequency characteristics.

During the above optical modulation, the ambient temperature varies due to heating of peripheral devices or depending on the temperature condition of a use environment. The variation in ambient temperature causes thermal deformation (expansion or contraction) of the bumps 18, as a result of which the position of the connection transmission line 20 that is supported by the bumps 18 varies.

However, in the optical device 10 according to this embodiment, the optical modulator 14 is fixed to the chip carrier 12 with AuSn solder and the chip carrier 12 is fixed to the external optical system. Therefore, even if the ambient temperature varies and the bumps 18 are thermally deformed, the position of the optical modulator 14 does not vary though the position of the connection transmission line 20 varies.

Therefore, the positional deviation of the optical modulator 14 relative to the external optical system that is caused by a variation in ambient temperature can be made small. Therefore, deteriorations in characteristics due to an optical axis deviation or the like can be prevented and the optical device 10 is given high optical axis stability.

That is, by virtue of the use of the bumps 18 in the electrical signal transmission system, the optical device 10 is given high optical axis stability while superior frequency characteristics are maintained.

In the connection transmission line 20, each of the signal connection line 58 and the ground connection lines 60 is divided into two parts at the center. Therefore, each of the signal connection line 58 and the ground connection lines 60 is divided into the portion connected to the external signal line and the termination-side portion, and hence there is no short-circuiting line that extends parallel with the optical modulator 14 in contrast to the case of the conventional configuration. This prevents reduction of signal power to be transmitted to the p-side electrode pads 44 of the optical modulator 14 and hence can prevent reduction in modulation efficiency.

Further, since the signal line 16b of the termination-side transmission line 16 is connected to the ground lines 16c via the termination resistor 66, the loss of signal power can be reduced and hence reduction in modulation efficiency can be prevented.

Figure 9:
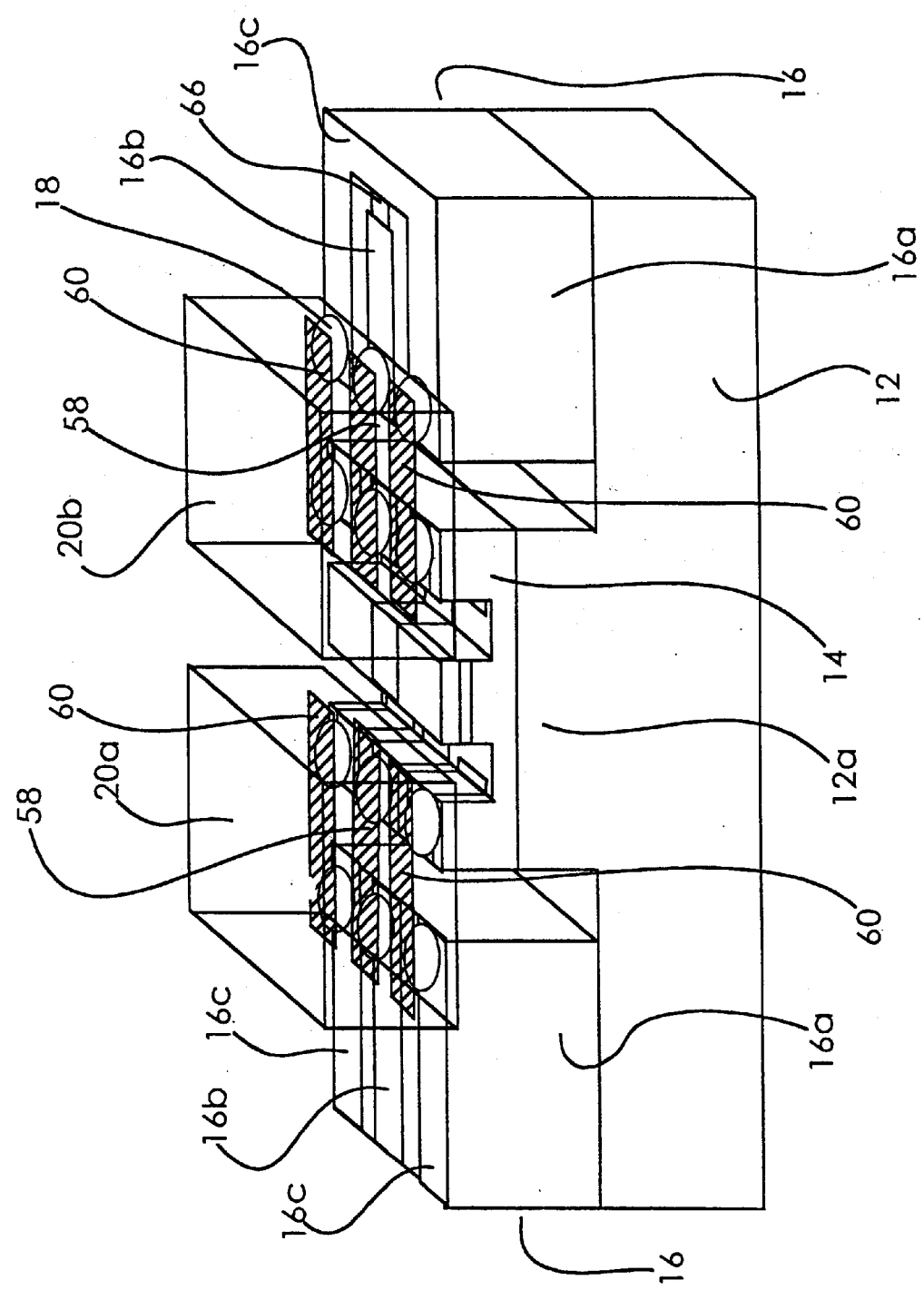
FIG. 9 is a partially see-through perspective view of another optical device according to the invention.

FIG. 9 is a partially see through perspective view of an optical device according to a modification of the first embodiment. In FIG. 9, reference numeral 70 denotes an optical device. In the optical device 70, the connection line substrate 56 of the connection transmission line 20 is divided into two parts to form a connection transmission line 20a on the side of the transmission line 16 to which external wiring (not shown) is connected and a connection transmission line 20b on the side of the termination-side transmission line 16, which corresponds to the structure that each of the signal connection line 58 and the ground connection lines 60 is divided into two parts at the center.

Each of the connection transmission line 20a and the termination-side connection transmission line 20b is provided with the signal connection line 58 and the ground connection lines 60.

The optical device 70 provides the same advantages as the above-described optical device 20 does. Further, since the connection transmission line 20 is divided into two parts, that is, the connection transmission lines 20a and 20b, the optical waveguide ridge 30 of the optical modulator 14 can be recognized visually from above. Since the position of the optical waveguide layer 34 can easily be recognized, another advantage is attained that the optical waveguide layer 34 can easily be optically coupled to an external optical system (e.g., optical fibers).

Figure 10:
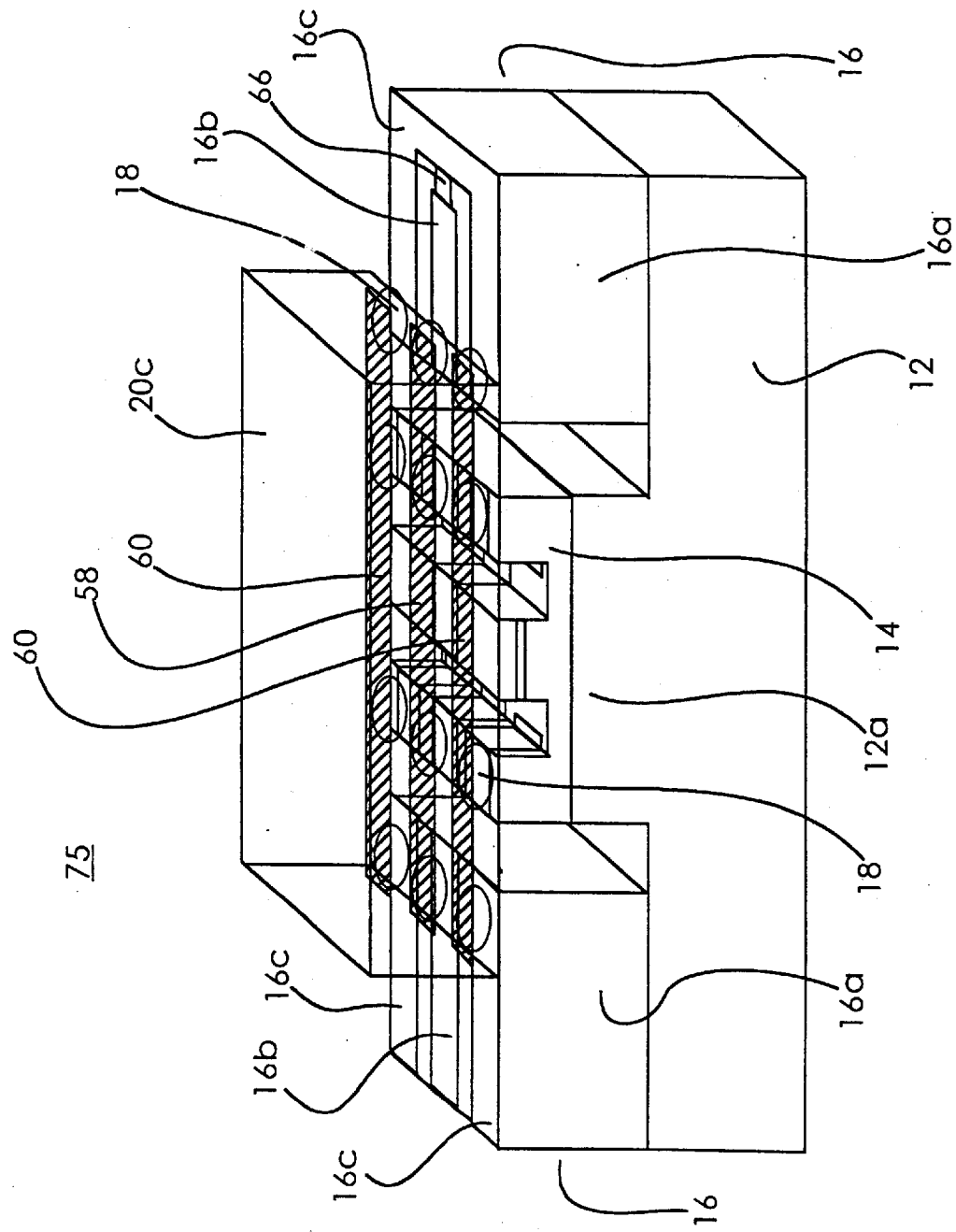
FIG. 10 is a partially see-through perspective view of a further optical device according to the invention.
Figure 11:
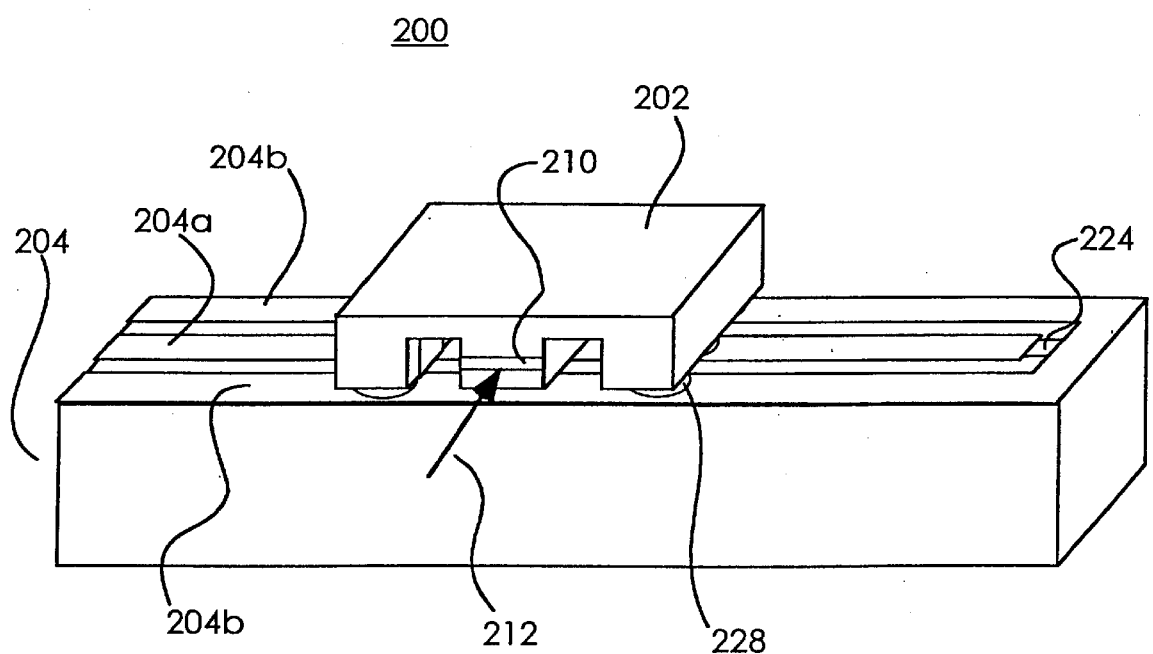
FIG. 11 is a perspective view of a conventional optical device.
Figure 12:
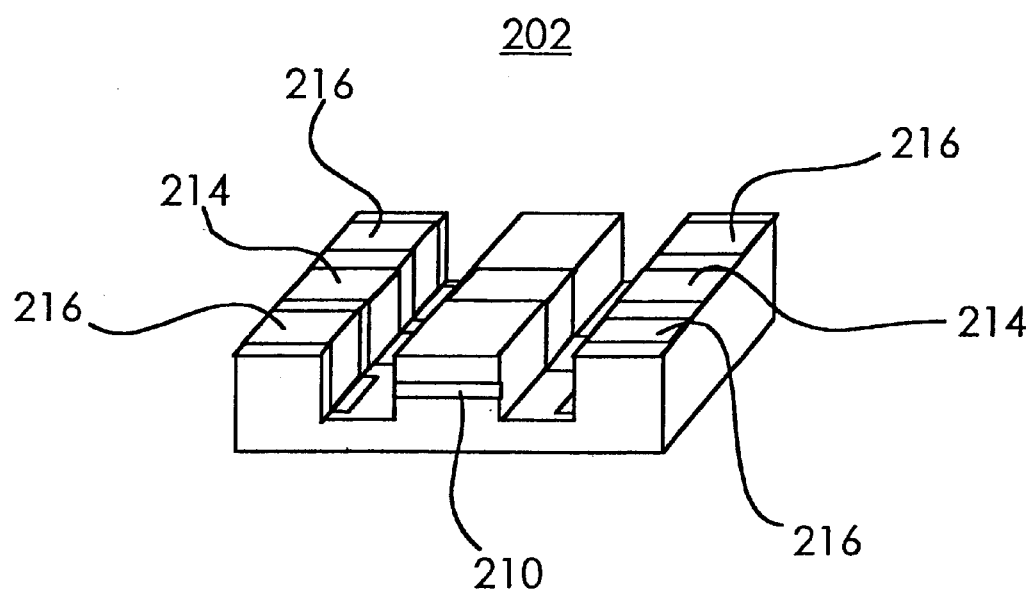
FIG. 12 is a perspective view of optical modulator according to the conventional optical device.
Figure 13:
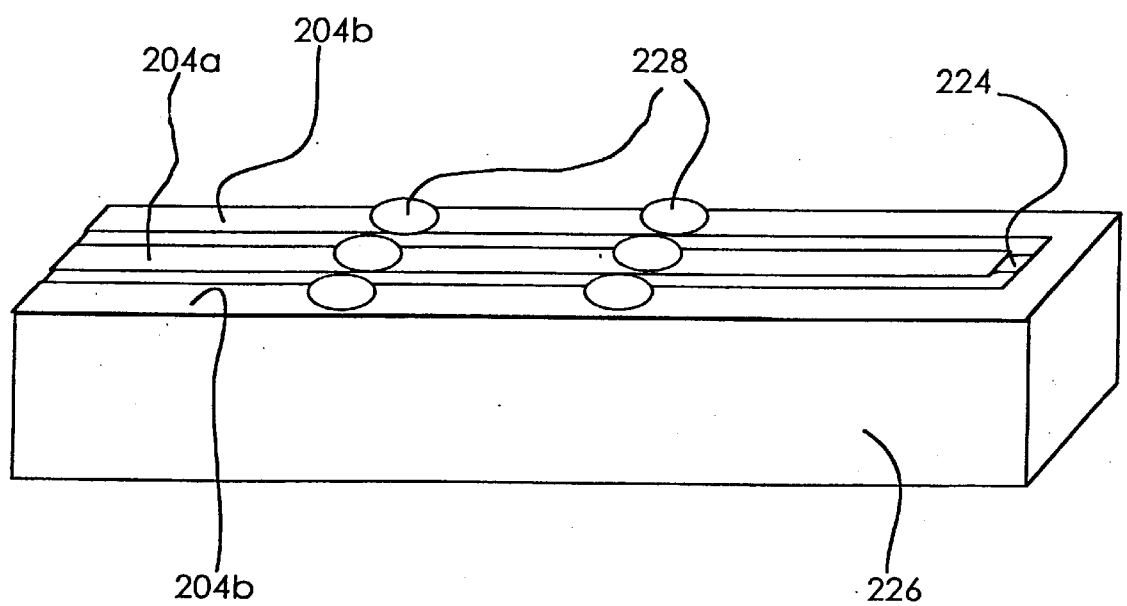
FIG. 13 is a perspective view of the conventional transmission line.

FIG. 10 is a partially see-through perspective view of an optical device according to another modification of the first embodiment.

In FIG. 10, reference symbol 75 denotes an optical device and 20c denotes a connection transmission line.

In the connection transmission line 20c of the optical device 75, each of the signal connection line 58 and the ground connection lines 60 is not divided at the center and is a continuous line instead. Therefore, the connection transmission line 20c has a short-circuiting line that expends parallel with the optical modulator 14, and hence signal power that is transmitted to the p-side electrode pads 44 of the optical modulator 14 is made slightly smaller than in the above-described optical modulator 10. However, in the other points, the optical device 75 provides the same advantages as the optical device 10 does.

The invention provides an optical device comprising an optical device pedestal; an optical modulator having a back surface that is joined to the pedestal and a front surface where a signal electrode pad and a ground electrode pad are arranged; a pair of transmission lines that are provided on the pedestal on both sides of the optical modulator and each of which has a signal line and a ground line on a front surface of a first dielectric substrate; conductive bumps provided on surfaces of the signal line and the ground line of each of the transmission lines and surfaces of the signal electrode pad and the ground electrode pad of the optical modulator, respectively; and a connection transmission line that has a signal connection line and a ground connection line provided on a front surface of a second dielectric substrate, that is oriented in such a manner that the signal connection line and the ground connection line are opposed to the bumps, and that connects, by means of the signal connection line and the ground connection line, the bumps on the electrode pads of the optical modulator with the bumps on the transmission lines. Since the optical modulator can directly be fixed to the pedestal, a positional deviation from an external optical system can be prevented that would otherwise be caused by a positional variation of the optical modulator due to thermal deformation of the bumps. The use of the bumps makes it possible to prevent deteriorations in optical characteristics due to an optical axis deviation or the like while maintaining superior frequency characteristics. Therefore, an optical device having high optical axis stability can be formed while superior frequency characteristics are maintained.

Each of the transmission lines and the connection transmission line is a coplanar line, and in the optical modulator a plurality of ground electrode pads are provided in a number that is equal to the number of ground lines of each of the transmission lines. This simplifies the structures of the transmission lines and the connection transmission line. Therefore, an inexpensive optical device can be formed.

Signal electrode pads and ground electrode pads are provided on the front surface of the optical modulator on both sides of an optical waveguide layer having a light absorption layer that is provided in the optical modulator, and each of the signal connection line and the ground connection line or lines of the connection transmission line is divided into two parts that correspond to the signal electrode pads or the ground electrode pads located on both sides of the optical waveguide layer. This can decrease signal power that does not go through the device side and hence can prevent reduction in modulation efficiency. Therefore, an optical device having high modulation efficiency can be formed.

The connection transmission line is divided into two parts that correspond to two respective sets of a divisional signal connection line and a divisional ground connection line or lines. Since the position of the optical waveguide of the optical modulator can easily be recognized visually from above, optical coupling to an external optical system can be performed easily. Therefore, an easily mountable optical device can be formed.

Further, the signal line of one of the pair of transmission lines is connected to the ground line or lines via a termination resistor. This can improve the impedance matching and hence can increase the modulation efficiency. Therefore, an optical device having high modulation efficiency can be formed.

The invention also provides a manufacturing method of an optical device, containing the steps of preparing an optical device pedestal having a joining portion; joining, to the joining portion of the pedestal, a back surface of an optical modulator having a signal electrode pad and a ground electrode pad on a front surface; providing, on both sides of the joining portion of the pedestal, a pair of transmission lines each having a signal line and a ground line on a front surface of a first dielectric substrate; forming conductive bumps on surfaces of the signal electrode pad and the ground electrode pad of the optical modulator and surfaces of the signal line and the ground line of each of the transmission lines; and orienting a connection transmission line having a signal connection line and a ground connection line on a front surface of a second dielectric substrate in such a manner that the signal connection line and the ground connection line are opposed to the bumps, and connecting the bumps on the electrode pads of the optical modulator with the bumps on the transmission lines by means of the signal connection line and the ground connection line. This manufacturing method makes it possible to manufacture an optical device having high optical axis stability by a simple process while maintaining superior frequency characteristics. Therefore, an optical device having high optical axis stability and superior frequency characteristics can be provided at a low cost.

While the presently preferred embodiments of the present invention have been shown and described, it is to be understood these disclosures are for the purpose of illustration and that various changes and modifications may be made without departing from the scope of the invention as set forth in the appended claims.

The entire disclosure of a Japanese Patent Application No. 2000-319707, filed on Oct. 19, 2000 including specification, claims, drawings and summary, on which the Convention priority of the present application is based, are incorporated herein by reference in its entirety.

What is claimed is:

1. An optical device comprising:
   an optical device pedestal having opposed first and second surfaces;
   an optical modulator having a back surface joined to the first surface of the optical device pedestal and a front surface, opposed to the back surface, and on which a first signal electrode pad and a first ground electrode pad are located;
   a first dielectric substrate having opposed front and back surfaces, the back surface of the first dielectric substrate being located on the first surface of the optical device pedestal, spaced from and at one side of the optical modulator;
   a first transmission line including a first signal line and a first ground line on the front surface of the first dielectric substrate;
   respective conductive bumps on surfaces of the first signal line and the first ground line and on surfaces of the first signal electrode pad and the first ground electrode pad of the optical modulator;
   a second dielectric substrate; and
   a first connection transmission line including a first signal connection line and a first ground connection line on a front surface of the second dielectric substrate, the first signal connection line and the first ground connection line being opposed to the bumps on the first signal line, the first ground line, the first signal electrode pad, and the first ground electrode pad, the first connection transmission line connecting, through the first signal connection line and the first ground connection line, the bumps on the first signal electrode pad and the first ground electrode pad of the optical modulator with the bumps on the first transmission line.

2. The optical device according to claim 1, wherein each of the first transmission line and the first connection transmission line is a coplanar line, and the optical modulator includes a plurality of first ground electrode pads equal in number to the first and second ground lines of each of the first transmission line and first connection transmission line.

3. The optical device according to claim 1, including a termination resistor wherein the first signal line is connected to the first ground line via the termination resistor.

4. The optical device according to claim 2, including a termination resistor wherein the first signal line is connected to the first ground line via the termination resistor.

5. The optical device according to claim 1 wherein the optical device includes a second signal electrode pad and a second ground electrode pad, the optical device further comprising:
   a third dielectric substrate having opposed front and back surfaces, the back surface being located on the first surface of the optical device pedestal on a side of the optical modulator opposite the first dielectric substrate;
   a second transmission line having a second signal line and a second ground line on the front surface of the third dielectric substrate;
   respective conductive bumps on surfaces of the second signal line and the second ground line and on surfaces of the second signal electrode pad and the second ground electrode pad of the optical modulator; and
   a second connection transmission line including a second signal connection line and a second ground connection line on the front surface of the second dielectric substrate, the second signal connection line and the second ground connection line being opposed to the bumps on the second signal line, the second ground line, the second signal electrode pad, and the second ground electrode pad, respectively, the second connection transmission line connecting, through the second signal connection line and the second ground connection line, the bumps on the second signal electrode pad and the second ground electrode pad of the optical modulator with the bumps on the second transmission line.

6. The optical device according to claim 5, wherein the first and second signal electrode pads and the first and second ground electrode pads are located on the front surface of the optical modulator on opposite sides of an optical waveguide layer having a light absorption layer of the optical modulator, and the first and second signal connection lines of the first and second connection transmission lines are divided into two parts that respectively correspond to the first and second signal electrode pads located on opposite sides of the optical waveguide layer.

7. The optical device according to claim 5, including a termination resistor wherein the first signal line is connected to the first ground line via the termination resistor.

8. The optical device according to claim 1 wherein the optical device includes a second signal electrode pad and a second ground electrode pad, the optical device further comprising:
   a third dielectric substrate having opposed front and back surfaces, the back surface being located on the first surface of the optical device pedestal on a side of the optical modulator opposite the first dielectric substrate;
   a second transmission line having a second signal line and a second ground line on the front surface of the third dielectric substrate;
   respective conductive bumps on surfaces of the second signal line and the second ground line and on surfaces of the second signal electrode pad and the second ground electrode pad of the optical modulator;
   a fourth dielectric substrate; and
   a second connection transmission line including a second signal connection line and a second ground connection line on a front surface of the fourth dielectric substrate, the second signal connection line and the second ground connection line being opposed to the bumps on the second signal line, the second ground line, the second signal electrode pad, and the second ground electrode pad, respectively, the second connection transmission line connecting, through the second signal connection line and the second ground connection line, the bumps on the second signal electrode pad and the second ground electrode pad of the optical modulator with the bumps on the second transmission line.

9. The optical device according to claim 8, wherein the first and second signal electrode pads and the first and second ground electrode pads are located on the front surface of the optical modulator on opposite sides of an optical waveguide layer having a light absorption layer of the optical modulator, and the first and second signal connection lines of the first and second connection transmission lines are divided into two parts that respectively correspond to the first and second signal electrode pads located on opposite sides of the optical waveguide layer.

10. The optical device according to claim 8, including a termination resistor wherein the first signal line is connected to the first ground line via the termination resistor.

11. The optical device according to claim 1 wherein the optical device signal electrode pad and a second ground electrode pad, the optical device further comprising:

a third dielectric substrate having opposed front and back surfaces, the back surface being located on the first surface of the optical device pedestal on a side of the optical modulator opposite the first dielectric substrate;

a second transmission line having a second signal line and a second ground line on the front surface of the third dielectric substrate; and respective conductive bumps on surfaces of the second signal line and the second ground line and on surfaces of the second signal electrode pad and the second ground electrode pad of the optical modulator, wherein the first signal connection line and the first ground connection line on the front surface of the second dielectric substrate are opposed to the bumps on the second signal line, the second ground line, the second signal electrode pad, and the second ground electrode pad, the first connection transmission line connecting, through the first signal connection line and the first ground connection line, the bumps on the first and second signal electrode pads and the first and second ground electrode pads of the optical modulator with the bumps on the first and second transmission lines.

12. The optical device according to claim 11, including a termination resistor wherein the first signal line is connected to the first ground line via the termination resistor.

13. A method of manufacturing an optical device comprising:

preparing an optical device pedestal having opposed first and second surfaces, the first surface including a joining portion;

joining, to the joining portion of the optical device pedestal, a back surface of an optical modulator having signal electrode pads and ground electrode pads on a front surface, the front and back surfaces being opposed to each other;

mounting, on each of two opposite sides of the joining portion of the optical device pedestal and on opposite sides of the optical modulator, first and second dielectric substrates having respective transmission lines on front surfaces, each transmission line having a signal line and a ground line;

forming conductive bumps on the signal electrode pads and the ground electrode pads of the optical modulator and on surfaces of the signal lines and the ground lines of each of the transmission lines; and orienting a connection transmission line having respective signal connection lines and ground connection lines on a front surface of a third dielectric substrate so that the signal connection lines and the ground connection lines are opposed to the bumps on the signal lines and the ground lines of the transmission lines and on the signal electrode pads and the ground electrode pads of the optical modulator, and connecting the bumps on the optical modulator with respective bumps on the respective transmission lines through the signal connection lines and the ground connection lines.

* * * * *